3,384,622
RAPIDLY WATER-SOLUBLE GUANIDINE-FORMALDEHYDE RESIN AND PROCESS FOR THE MANUFACTURE THEREOF
Edward Helmut Sheers, Flushing, N.Y., assignor to American Cyanamid Company, Stamford, Conn., a corporation of Maine
No Drawing. Filed May 11, 1965, Ser. No. 454,994
7 Claims. (Cl. 260—72)

ABSTRACT OF THE DISCLOSURE

Hydrocolloid-reactive guanidine-formaldehyde resin in aqueous alkaline solution is spray-dried to a free-flowing powder which dissolves uniformly and rapidly in cold water, by acidifying the solution to pH 6.8–7.5, spray-drying the solution into a current of air having a temperature less than 450° F., and rapidly cooling and recovering the resin particles thereby formed. The size of the droplets of the sprayed solution is such that the average diameter of the resin particles which are formed is less than 150 microns.

---

The present invention relates to the spray drying of aqueous solutions of hydrocolloid-reactive guanidine-formaldehyde resins which have a pH in excess of 8 to form a dry, particulate, rapidly water-soluble resinous powder, and includes the spray-dried product itself.

Aqueous solutions of hydrocolloid-reactive guanidine-formaldehyde resins are produced by reacting 1 mol of formaldehyde with 2 to 5 molar equivalents of a water-soluble guanidine salt in aqueous medium, at a pH above 8. The solutions thus obtained can be vacuum-dried, cf. McDonnell et al. U.S. Patent No. 3,002,881, but the solid which is thus obtained is difficult, if not impossible, to dissolve in water.

The discovery has been made that a dry resinous product is obtained which dissolves rapidly in water and which is storage-stable when aqueous solutions of hydrocolloid-reactive guanidine-formaldehyde resins are dried by a different method. According to the present invention, the resin solution (having as is normal a pH above 8) is first adjusted to substantial neutrality (to within the pH range of 6.8 to 7.5) by addition of acid. The solution is then dried by introducing it as a fine spray into a column of air having a temperature not in excess of 450° F. and rapidly cooling and recovering the resin particles which form. Moreover, the product of the present invention appears to exhibit superior effectiveness as a retention aid in paper manufacture for strength-imparting hydrocolloids.

In the process, it is critical that the pH of the solution to be spray-dried be within the range mentioned. With the pH of the solution to be dried is significantly higher than 7.5, the product has poor solubility and is not storage-stable. When the pH is significantly lower than 6.8, the resulting powder possesses poor efficiency as a reagent for hydrocolloids used in paper manufacture.

It is further critical (a) that the solution be introduced into the column of air as a spray composed of droplets of sufficient fineness so that the average diameter by weight of the dry resin particles formed is less than 150 microns, and (b) that the temperature of the column of air be less than 450° F. The resin powder is difficultly soluble or is not soluble at all when the air has a higher temperature, and this condition is aggravated when the average size of the particles is in excess of 150 microns.

The drying is performed in any conventional spray-drying apparatus so that the moisture content of the resin powder is less than 10% by weight, at about which point the powder becomes free-flowing and is apparently dry. The product, when reconstituted with water, has the general utility of the syrup of the McDonnell patent.

In practice, a resin powder of best free-flowing characteristics, water-solubility, storage-stability and efficiency as papermaking hydrocolloid reagent is generally produced when the resin solution being spray-dried has a pH of about 6.8–7.2, when the temperature of the air (into which the resin solution is introduced) is about 400° F., when the diameter of spray droplets is such that the diameter of the product particles is 75 microns, and when the dwell time of the resin in the spray-drying apparatus is such that the moisture content of the product is about 5%. Such moisture content provides a very free-flowing product of satisfactory storage stability.

The invention is usefully applied to the spray-drying of hydrocolloid-reactive solutions prepared, in general, as follows. One molar equivalent of a water-soluble guanidine salt (guanidine chloroacetate, nitrate, hydrochloride, carbonate or sulfate) is reacted at 60°–100° C. with stirring with three mols of formaldehyde in aqueous medium containing sufficient base (sodium or potassium hydroxide, sodium or potassium carbonate, diethyl benzyl ammonium hydroxide, etc.) to maintain the pH of the resulting solutions in the range of 8–9. The solution may, but need not, contain methanol, acetone, etc. The reaction is stopped while the resin which is obtained is water-soluble by cooling the solution. The pH of the resin solution is adjusted to 7 (by addition of water-soluble acidic material, e.g., hydrochloric, nitric, sulfuric, phosphoric, or p-toluenesulfonic acid), after which the solution is spray-dried as described above.

The resulting powder dissolves uniformly in ordinary tap water at 20° C. in less than 10 minutes when sprinkled thereon with rapid agitation.

The rate at which the resin powder dissolves in water is increased when a small amount, less than 5% of the weight of the guanidine and the formaldehyde, of a water-soluble cationic monomeric quaternary ammonium salt containing at least one $>C_8$ aliphatic substituent (e.g. dodecyltrimethyl ammonium chloride) is added to the resin solution prior to the dehydration step.

The resulting resin powder is stable at room temperature at least for several months and at the end of that time is rapidly dissolvable in water.

The process of the present invention consists essentially of the steps set forth above, but it will be understood that modifications may be introduced therein such as are apparent to men skilled in the art and which do not change the essential character of the resin powder product. Thus the solution to be dried may comprise a small amount of some other non-ionic amidogen formaldehyde resin for example urea-formaldehyde resin; other compatible resinous material, for example, polyacrylamide, polyvinyl alcohol, and papermaker's starch; pigmentary material for example, titanium dioxide, ultramarine blue, calcium carbonate, and clay (in addition to the other compatible materials shown in said McDonnell et al. patent).

The composition of the spray dried powder obtained by the above-described process has not been ascertained other than as stated above, and the properties of the resin which cause it to dissolve so rapidly in water as described are not known. The reason why the above-described resin solution, with or without the quaternary ammonium compound, can be spray dried so successfully to form a water-soluble powder is not understood and the invention does not depend on ascertainment of the explanation.

The invention will be further described with reference to the examples which follow. These examples constitute

Example 1

Into a steam-jacketed reaction vessel equipped with stirrer and thermometer are charged with stirring 407 lbs. of de-ionized water, 161 lbs. of 50% sodium hydroxide solution, 337 lbs. (3.2 mols) of guanidine hydrochloride of 91% purity and 337 lbs. (9.6 mols) of fresh paraformaldehyde of 91% purity. The mixture is heated to 80° C. The pH is maintained between 8.0 and 9 by addition of 50% sodium hydroxide solution as necessary.

When the Gardner-Holdt viscosity of the reaction mixture at 25° C. reaches P-T, full cooling is applied to the jacket and 300 lbs. of de-ionized water are added. The pH of the solution is then adjusted to 7 by addition of glacial acetic acid.

The resulting addition is fed into a laboratory spray drier at the rate of 50 ml. of solution per minute under conditions such that the inlet air temperature of the drier is 400° F. and the outlet air temperature at 150° F. The size of the sprayed particles and the duration of the drying are such that the product contains 5.20% by weight of moisture and has an average particle size of about 75 microns with approximately 90% of the particles being between 50 and 100 microns in diameter.

The product is a free-flowing powder. A clear solution forms within 5 minutes without clumping when 20 g. of the powder is stirred into 100 cc. of water at 20° C.

When the procedure is repeated with the inlet air temperature of the spray drier at 450° F., the resulting product dissolves at a satisfactorily rapid but noticeably slower rate requiring about 5 minutes to dissolve and remain similarly soluble after storage for 3 months at room temperature. When the inlet air temperature is 500° F., the product as obtained is substantially insoluble in water at 20° C.

When the procedure is repeated with a resin solution having a pH of 8, the powder is poorly soluble in water at 20° C.

When the procedure is repeated with a resin solution having a pH of 6, the resulting powder possesses poor efficiency as a reagent for hydrocolloids in paper manufacture.

Example 2

The procedure of Example 1 is repeated except that the guanidine hydrochloride is replaced with 291 lbs. (3.2 mols) of guanidine carbonate of 99% purity, and addition of sodium hydroxide to adjust the pH is omitted. On addition of the guanidine carbonate, the pH of the solution rises to 10.5 but quickly drops to about 8.2-8.4 and thereafter remains within this range without attention. Substantially the same product is obtained.

Example 3

The procedure of Example 2 is repeated except that the inlet air temperature of the spray drier is 450° F. and the resin solution has a dissolved content of 1% (based on the weight of the resin solids therein) of dodecyldimethylbenzyl ammonium chloride. The resulting powder contains about 5% moisture by weight. Twenty grams of the powder dissolve in 100 cc. of water at 20° C. with stirring in approximately two minutes.

Example 4

The procedure of Example 2 is repeated except that the speed of air flow through the drier is increased so that the particles obtained have a moisture content of 90% by weight. The particles are free-flowing and apparently dry and dissolve in less than 3 minutes in water at 20° C.

Example 5

The procedure of Example 3 is repeated except that the quaternary ammonium compound therein is replaced by an equal weight of dodecyl pyridinium chloride. A product having similar rapid solubility is obtained.

Example 6

The procedure of Example 3 is repeated except that the quaternary ammonium compound therein is replaced by tetradecyl morpholinium chloride. A similar product is obtained.

I claim:

1. A process for spray-drying a hydrocolloid-reactive guanidine-formaldehyde resin solution having a pH above 8, which comprises adjusting the pH of said solution to 6.8–7.5, spraying said solution into a current of air having a temperature less than 450° F. thereby spray-drying said resin to free-flowing apparently dry state, and rapidly cooling and recovering the resin particles thereby formed; the size of the droplets of said sprayed solution being such that the average diameter of the resin particles formed is less than 150 microns.

2. A process according to claim 1 wherein the resin solution on being spray-dried contains a small but effective amount of a water-soluble cationic monomeric quaternary ammonium salt containing at least one $>C_8$ aliphatic substituent as agent improving the rate at which the recovered guanidine-formaldehyde resin particles dissolve in water.

3. A process according to claim 1 wherein the pH of the solution being sprayed is 6.8–7.2.

4. A process according to claim 1 wherein the solution is sprayed into a current of air having a temperature less than 400° C.

5. A process according to claim 1 wherein the size of the droplets of the spray is such that the average diameter of the particles of the dried resin is about 75 microns.

6. A process according to claim 1 wherein the apparently dry particles have a moisture content of about 5% by weight.

7. Dry, particulate rapidly water-soluble guanidine-formaldehyde resin prepared by a process according to claim 1.

References Cited

UNITED STATES PATENTS

| | | | |
|---|---|---|---|
| 2,266,265 | 12/1941 | Rieche et al. | 260—72 |
| 3,002,881 | 10/1961 | McDonnell et al. | 162—166 |

OTHER REFERENCES

Chemistry of Synthetic Resins, Ellis, vol. 1, Reinhold Pub. Corp., 1935, pp. 613–614.

"Powdering Liquids by Spray-Pro," Spray Dryer Process Corp., New York, N.Y., TP 363.S67.

WILLIAM H. SHORT, *Primary Examiner.*

E. M. WOODBERRY, *Assistant Examiner.*